(No Model.)
R. J. HENSON.
SAWING MACHINE.
No. 290,425.                    Patented Dec. 18, 1883.
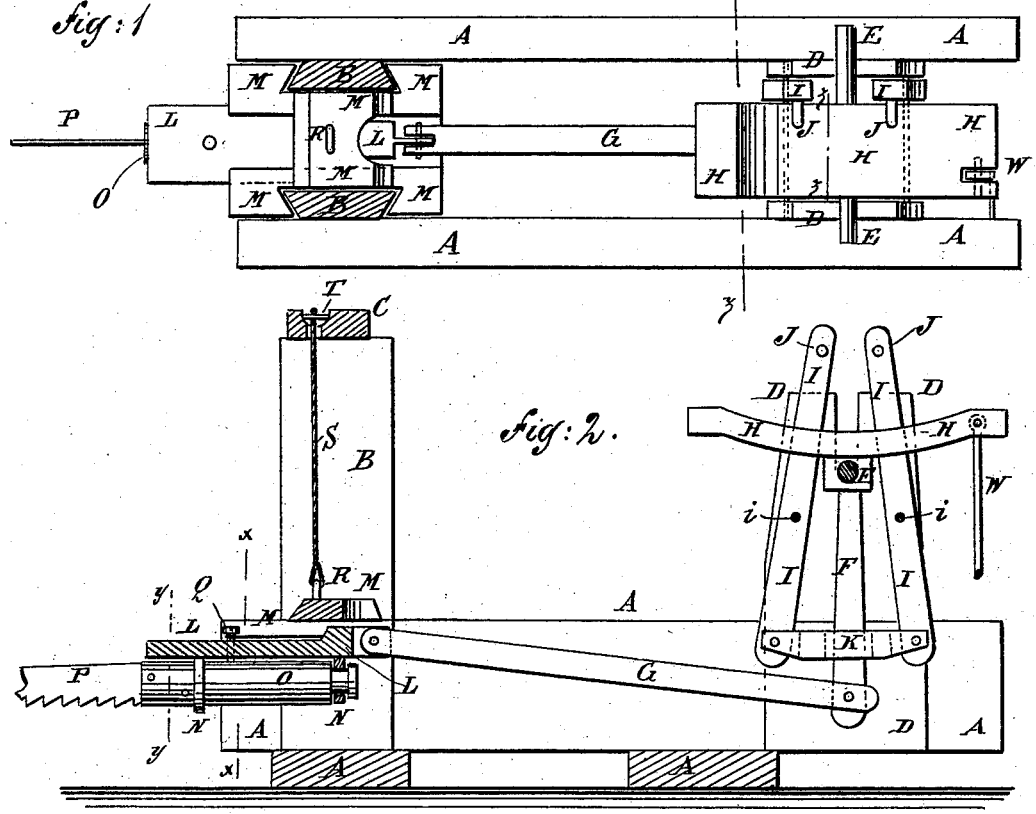
WITNESSES:
Chas. Nida.
C. Sedgwick
INVENTOR:
R. J. Henson
BY Munn & Co.
ATTORNEYS.

UNITED STATES PATENT OFFICE.

ROBERT JOSEPH HENSON, OF CAIRO, ILLINOIS.

SAWING-MACHINE.

SPECIFICATION forming part of Letters Patent No. 290,425, dated December 18, 1883.

Application filed July 18, 1883. (No model.)

*To all whom it may concern:*

Be it known that I, ROBERT J. HENSON, of Cairo, in the county of Alexander and State of Illinois, have invented certain new and useful Improvements in Sawing-Machines, of which the following is a full, clear, and exact description.

Reference is to be had to the accompanying drawings, forming part of this specification, in which similar letters of reference indicate corresponding parts in all the figures.

Figure 1 is a plan view of my improved machine, partly in section. Fig. 2 is a sectional side elevation of the same. Fig. 3 is a sectional end elevation of the same, the frame being shown in section through the line $x\,x$, Fig. 2, and the sliding frame and bar through the line $y\,y$. Fig. 4 is a sectional end elevation of the same, taken through the line $z\,z\,z\,z$, Fig. 1.

The object of this invention is to facilitate the sawing of logs and other timber.

The invention consists in a sawing-machine constructed with a rock-shaft having a rigid arm and tilting platform, and vibrating levers connected with the rock-shaft arm, the said arm being also connected by a bar with the horizontal sliding bar and the vertically-sliding frame, that carry the saw, as will be hereinafter fully described.

A represents the base-frame of the machine, to the forward part of which are attached two standards, B, connected at their upper ends by a cross-bar, C.

To the rear part of the base-frame A are attached two standards, D, the upper ends of which are slotted to form bearings for the rock-shaft E.

To the middle part of the rock-shaft E is attached the upper end of an arm, F, the lower end of which is pivoted to the rear end of the connecting-rod G, that operates the saw, so that the said saw will be operated by the reciprocating movement of the said shaft E.

To the upper side of the rock-shaft E is attached a platform, H, which may be slightly curved, as shown in Fig. 2, so that an operator, by standing upon the platform H with a foot upon each side of the shaft E, can operate the said shaft by throwing his weight first upon one foot and then upon the other.

To one of the standards D are pivoted at $i$, upon the opposite sides of the rock-shaft E, two levers, I, the upper ends of which are provided with handles J. The lower ends of the levers I are pivoted to the opposite ends of a bar, K, through an aperture in the middle part of which the arm F passes, so that the said arm can be vibrated by operating the levers I by hand to give motion to the connecting-rod G, and through it to the saw. The forward end of the bar G is pivoted to the rear end of a bar, L, the side edges of which slide in grooves in the inner sides of the side bars of the frame M.

To the under side of the sliding bar L are attached bearings N to receive the cylindrical shank O, to the forward end of which is attached the saw P, so that the saw will be operated by the reciprocal movements of the sliding bar L. The shank O is held from turning in the bearings N by a set-screw, Q, which passes in through the bar L and rests against the said shank O, so that by loosening the said screw Q the saw P can be set to cut vertically, horizontally, or at an inclination, as may be required.

In the outer sides of the side bars of the frame M are formed dovetailed grooves to receive and slide upon the standards B, which are correspondingly dovetailed, so that the said standards serve as ways for the said frame to slide up and down upon.

To the cross-bar of the frame M is secured by an eye-screw, R, or other suitable means, the lower end of the cord S, which passes through a guide-hole formed in the cross-bar C, and over guide pins or pulleys T, attached to the said cross-bar, so that the frame M, and with it the saw P, can be raised and lowered by operating the cord S. The cord S passes down along the outer side of one of the standards B, and has a pin, U, attached to its end, to enter a hole, V, in the said standard B, and fasten the frame M and saw P in a raised position, so that the timber to be sawed can be readily adjusted. Several holes V are formed in the standard B to receive the pin U, so that the saw can be supported at any desired elevation.

In using the machine the saw is raised and secured at a suitable height, the timber is adjusted, and the saw is released, is allowed to rest on the timber, and is operated by operating the platform H or levers I, as hereinbefore described. The saw is fed down, as it cuts its way into the timber, by its own weight and the weight of the bar L and frame M; or additional weight can be placed upon the frame M, if desired. With this construction the sawyer can operate the machine by hand-power, by foot-power, or by both at the same time.

If desired, the piston-rod of a pump, the dasher of a churn, or any other machine worked by a reciprocating movement can be connected with the rocking platform H, so as to be operated by the movements of the said platform, as indicated at the point W in Figs. 1 and 2.

I do not abandon or dedicate to the public any patentable feature set forth herein and not hereinafter claimed, but reserve the right to claim the same either in a reissue of any patent that may be granted upon this application, or in other applications for Letters Patent that I may make.

I am aware that it is not new to reciprocate a saw by rocking a single middle-pivoted lever having a handle at each end and connected by a rigid median bar with the saw-carrying slide; but What I do claim as new and of my invention is—

The combination of a rock-shaft having an arm connected by an end-pivoted rod with the saw-slide, a cross-bar, K, rigidly fastened to said arm, the two levers I I, pivoted to the ends of said cross-bar, and a platform, H, arranged over the rock-shaft, as shown and described.

ROBERT JOSEPH HENSON.

Witnesses:
   JOHN TYLER,
   PATRICK MAHONEY.